United States Patent [19]

Hengesbach

[11] 3,945,396
[45] Mar. 23, 1976

[54] RAPID SEATING CHECK VALVE

[76] Inventor: Robert W. Hengesbach, 7886 Munson Road, Mentor, Ohio 44060

[22] Filed: Feb. 24, 1975

[21] Appl. No.: 552,042

[52] U.S. Cl. ................ 137/496; 137/540; 137/542
[51] Int. Cl.² ................ F16K 17/04; F16K 15/02
[58] Field of Search ...... 137/496, 540, 542, 543.13, 137/543, 528; 251/118, 356, 369

[56] References Cited
UNITED STATES PATENTS

| | | | |
|---|---|---|---|
| 1,844,613 | 2/1932 | Thompson | 137/496 |
| 1,930,040 | 10/1933 | Crowley | 137/496 X |
| 2,597,057 | 5/1952 | Bergquist | 137/470 |
| 2,672,881 | 3/1954 | Jay et al | 137/470 |
| 2,755,816 | 7/1956 | Collins | 137/496 |
| 2,797,705 | 7/1957 | Frantz | 137/496 X |
| 3,756,273 | 9/1973 | Hengesbach | 137/540 |
| 3,782,410 | 1/1974 | Steuby | 137/496 |

FOREIGN PATENTS OR APPLICATIONS

| | | | |
|---|---|---|---|
| 9,766 | 1913 | United Kingdom | 137/496 |

Primary Examiner—Martin P. Schwadron
Assistant Examiner—Robert J. Miller
Attorney, Agent, or Firm—John Harrow Leonard

[57] ABSTRACT

A check valve has a body with a seat therein and a valve plug movable toward the seat to closed position and away from the seat to open position. The valve plug has a forward face facing toward the seat and body inlet and a rear face facing away from the seat and toward the body outlet. The plug, at its rear face, has a stem of smaller diameter than the rear face so that an annular area of the rear face of the plug is exposed rearwardly toward the body inlet. The stem has fins thereon of a shape to impede the return flow of fluid relative to the stem in a direction toward the seat and thereby assist in rapid closure of the valve. The rear face of the plug is concave rearwardly and slopes inwardly from its outer periphery toward its axis at a very slight angle to further assist in rapid closure, while reducing outward radial components of flow of return fluid.

7 Claims, 4 Drawing Figures

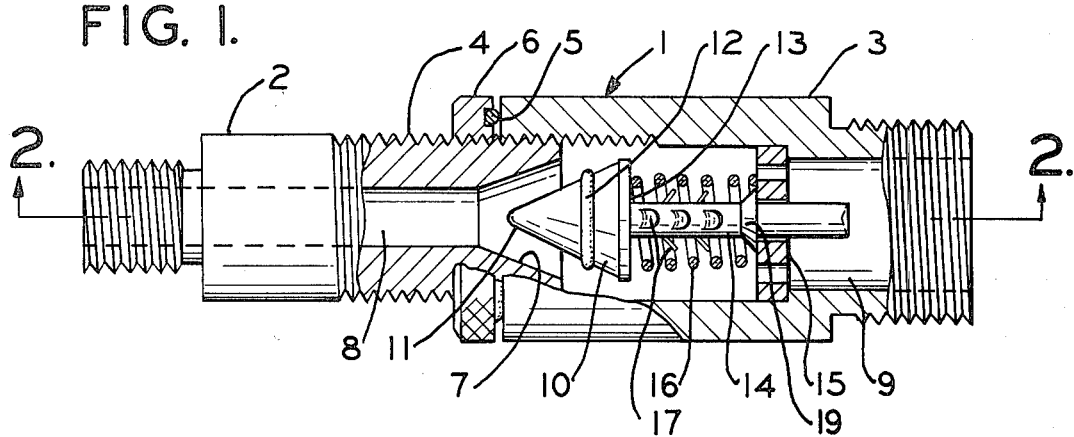
FIG. 1.
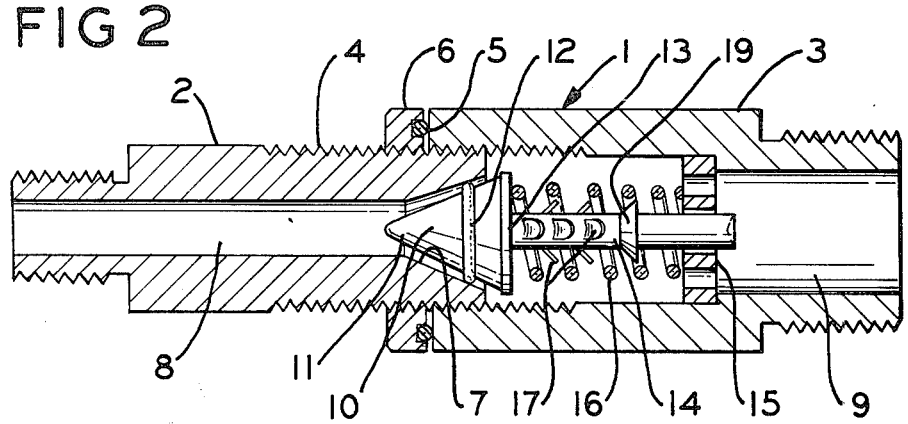
FIG 2
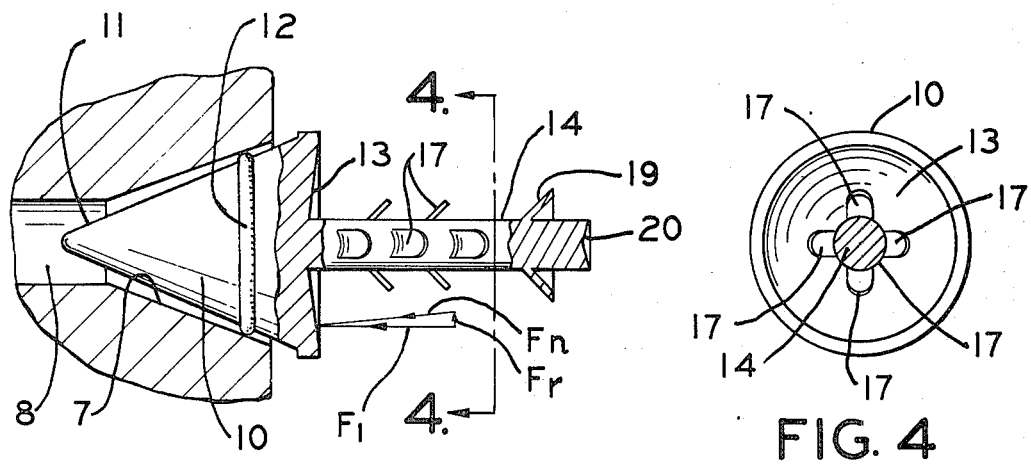
FIG. 3
FIG. 4

RAPID SEATING CHECK VALVE

BACKGROUND OF INVENTION

1. Field of Invention

Check valves.

2. Description of Prior Art

Conventional check valves have a body with a seat therein and a valve plug movable toward and away from the seat and guided by a stem at the rear face of the plug and extending away from the seat toward the body outlet. Generally, the rear face of the plug is flat, or deeply concave for purposes of reducing weight. The stem generally is smooth throughout its length. As a result of the configuration of the stem and rear face of the plug, the return flow of fluid is not applied as effectively as desired for assisting in rapid seating of the plug and, consequently, there is a tendency for the plug to seat sluggishly, whereas seating as nearly instantaneously as possible is desired.

SUMMARY

The present check valve has a plug and stem configured to cause the return flow to be more effectively applied in a manner to cause more rapid seating of the plug than normally occurs in the absence of the special configuration, whether the plug is spring seated or not.

BRIEF DESCRIPTION OF THE DRAWINGS

FIG. 1 is a longitudinal sectional view of a check valve embodying the principles of the present invention, parts thereof being shown in elevation for clearness in illustration, and the plug being shown in open position;

FIG. 2 is a longitudinal sectional view similar to FIG. 1, showing the plug in the closed position;

FIG. 3 is an enlarged fragmentary longitudinal sectional view of the valve, partly in elevation, showing the configuration of the plug and stem for increasing the rapidity of seating of the valve plug by return flow of fluid; and FIG. 4 is a cross sectional view of the plug shown in FIG. 3, and is taken on the line 4—4 thereof.

The valve shown herein for purposes of illustration is similar to that shown in my U.S. Pat. No. 3,756,273, issued Sept. 4, 1973. The valve comprises a hollow body 1 having an inlet portion 2 and an outlet portion 3. In the form illustrated, the inlet portion 2 is connected to the outlet portion 3 by threads 4 and the juncture between the portions 2 and 3 is sealed by an O-ring seal 5 drawn tightly into sealing relation by a threaded collar 6.

The inlet portion 2 of the body has a seat 7 and an inlet passage 8 communicating therewith. The outlet portion 3 of the body has a discharge passage 9.

Mounted in the body between the seat 7 and the outlet passage 9 is a plug 10 which, in the form illustrated, has a forward face 11 which faces the inlet passage 8 and which is conical or frusto-conical. An O-ring 12 is carried by the plug for effecting sealing relation between the plug 10 and the seat 7 when the plug is in its seated or forward position.

The plug has a rear face 13 and a stem 14 which is coaxial with the plug and has a rearwardly extending portion which is reciprocable in, and guided loosely by, a suitable spider 15. A compression spring 16 may be provided and interposed between the rear face of the plug 10 and the spider 15 for biasing the plug to seated position which, in the present instance, is one in which the sealing is effected by the O-ring 12 with the seat 7, with or without engagement of the forward face 11 of the plug 10 with the seat 7.

The structure thus far described is known in the art. It is illustrated, for example, in my United States Letters Patent hereinbefore identified. Thus, when supply pressure fluid is being introduced through the passage 8, it unseats the plug 10 against the biasing force of the spring 16 and discharges through the outlet passage 9. Upon discontinuance of the input flow, the plug 10 is seated by the spring assisted by any return flow or, if the valve is arranged with the plug operable upwardly, by gravity and the initial return flow.

It is during closure that the difficulties are encountered. For example, assuming there is a substantial return head against which the fluid is being pumped, upon discontinuance of the input supply, the return fluid bearing against the rear face of the plug and stem urges the plug to seating position. However, this return fluid, upon bearing against a rear flat face of a plug or against water accumulated in a deeply concave rear face, tends to be diverted both inwardly toward the stem and outwardly toward the periphery of the rear face of the plug. As a result its force is dissipated to some extent in turbulence and the like, and hence does not assist in moving the plug toward its seat as rapidly as the return flow force could were it more effectively applied. Thus, a direct thrust of fluid endwise or parallel to the axis of the plug, upon striking a flat rear face of the plug produces components of fluid flow and force directed radially outwardly and components of flow and force directed radially inwardly, and thereby wasting itself in creating turbulence, whereas it would be desirable to utilize this flow and force more effectively for returning the plug to seated position.

To this end, the rear face 13 of the plug is made concave rearwardly of the plug. Preferably the rear face is frustoconical, the rear face sloping radially inwardly and forwardly of the plug at a relatively small angle. For example, in axial section, illustrated in FIG. 3, each element of the rear face may slope inwardly toward the axis from its outer periphery entirely to the stem at an angle of about 5° with a plane normal to the axis of the stem, or outwardly from the axis of the stem at an angle of 85°. While 5° from the plane is preferred, this slope may range from about 1° to 10°, making the angle with the axis from about 89° to 80°.

As illustrated in FIG. 3, assuming the force of the return flow upon discontinuance of the input is parallel to the plug axis, as indicated at $F_1$, as it strikes the inwardly sloping rear face, its force is divided into two components, the smallest one of which is directed radially inwardly rather than radially outwardly, and the other of which is normal to the rear face. Thus it is divided into a small radial component Fr and a large component Fn which is normal to the curved or sloping face 13. This reduces the dissipation of the force in turbulenece and utilizes more of it for forcing the plug to the seated condition.

For further assisting in this return of the plug, the stem is provided with a plurality of return flow retarders or fins 17 which may be arranged in rows extending parallel to the axis of the stem and offset circumferentially from each other, with the fins of each row preferably staggered endwise of the stem with relation to the finds of the next adjacent rows. If desired, the fins may be sloped circumferentially of the stem so that the forces imposed by the return fluid tend to rotate the stem and plug slightly about their axes between successive seating operations.

The interruption of the flow by the rear faces of the fins results in a partial vacuum at the front faces, further assisting in the closing of the plug. As a result of the structure described, the flow of return fluid is converted to forces tending to seat the valve plug more rapidly.

Further, if desired, an annular rearwardly open frusto-conical cup-shaped flange 19 may be provided on the stem for a like purpose, and the end of the stem, as indicated at 20, may have a shallow cup-shape concavity, such as provided at the rear face of the plug. Due to the shallowness of the concavity on the rear face of the plug, the closing force of the return flow is utilized promptly and is not dissipated in churning up fluid and the like adjacent the seat.

Having thus described my invention, I claim:

1. A check valve comprising a body having a cavity with an inlet and an outlet communicating therewith, respectively;
   a seat in the cavity between the inlet and outlet;
   a valve plug member movable generally axially of the seat away from the seat in the opening direction and toward the seat in the closing direction, said valve plug having a rear face facing downstream away from the seat;
   a stem member carried by the valve plug member and coaxial therewith;
   return flow directing means on the plug member and exposed directly to the return flow through the valve, and shaped and arranged to render the return flow through the valve effective to cause rapid seating of the plug member; and
   said return flow directing means comprising a shallow concavity in the rear face of the valve member, coaxial with the stem, and extending radially outwardly therefrom toward the periphery of said rear face.

2. A check valve in accordance with claim 1 wherein the stem has a rear face facing downstream away from the seat; and
   the flow directing means further include a shallow concavity in the rear face of the stem member coaxial with the stem member and extending radially outwardly therefrom toward the periphery of the rear face of said stem member.

3. A check valve in accordance with claim 1 wherein the flow directing means further include fins on the stem member.

4. A check valve in accordance with claim 3 wherein the fins have front faces which face upstream toward the seat and slope outwardly from the stem member rearwardly downstream in the opening direction of the plug.

5. A check valve in accordance with claim 3 wherein the fins have rear faces facing downstream away from the seat which slope outwardly away from the stem member in the opening direction of the plug.

6. A check valve in accordance with claim 1 wherein, in axial section of the plug member, each element of said rear face, from the stem outwardly, is linear.

7. A check valve in accordance with claim 6 wherein, in said axial section, each said linear element slopes outwardly and rearwardly at an angle of about 89° to 80° to the axis of the plug member.

* * * * *